United States Patent [19]

Nysen et al.

[11] Patent Number: 5,182,570
[45] Date of Patent: Jan. 26, 1993

[54] END FED FLAT ANTENNA

[75] Inventors: Paul A. Nysen, Randwick, Australia; Jon L. Nagel, Cupertino, Calif.

[73] Assignee: X-Cyte Inc., Mountain View, Calif.

[21] Appl. No.: 803,712

[22] Filed: Dec. 4, 1991

Related U.S. Application Data

[63] Continuation of Ser. No. 434,233, Nov. 13, 1989, abandoned.

[51] Int. Cl.$^5$ ............ H01Q 9/160; H01Q 9/280; H01Q 19/240; H01Q 1/270
[52] U.S. Cl. ............ 343/795; 343/794; 343/802; 343/818; 343/820; 342/51
[58] Field of Search ............ 343/700 MS, 702, 795, 343/802, 818, 819, 820, 824, 825, 826, 827, 831, 821, 790, 794; 340/572; 342/51

[56] References Cited

U.S. PATENT DOCUMENTS

| | | | |
|---|---|---|---|
| 3,025,524 | 3/1962 | Thies | 343/795 |
| 3,689,929 | 9/1972 | Moody | 343/806 |
| 3,845,490 | 10/1974 | Manwarren et al. | 343/821 |
| 4,138,681 | 2/1979 | Davidson et al. | 343/825 |
| 4,259,673 | 3/1981 | Guretzky | 343/825 |
| 4,400,702 | 8/1983 | Tanaka | 343/806 |
| 4,642,640 | 2/1987 | Woolsey et al. | 340/572 |
| 4,703,327 | 10/1987 | Rossetti et al. | 342/51 |
| 4,737,789 | 4/1988 | Nysen | 342/51 |
| 4,737,790 | 4/1988 | Skeie et al. | 342/51 |
| 4,800,392 | 1/1989 | Garay et al. | 343/702 |
| 4,951,057 | 8/1990 | Nagel | 342/51 |
| 5,027,107 | 6/1991 | Matsuno et al. | 343/894 |

OTHER PUBLICATIONS

F. C. Judd, Two-metre Antenna Handbook, Omnidirectional Antennas (Chapter 2), pp. 25-33, 1980.
UK Patent Application, Hill et al. GB 2142475 Wide Beam Microwave Antenna Jan. 1985.

*Primary Examiner*—Rolf Hille
*Assistant Examiner*—Peter Toby Brown
*Attorney, Agent, or Firm*—Sprung, Horn, Kramer & Woods

[57] ABSTRACT

A planar dipole antenna is arranged on a non-conductive substrate having an exposed, planar surface. The antenna includes a first quarter wavelength element having a first end and an opposite second end and a second quarter wavelength element having a third end and an opposite fourth end. The first, second, third and fourth ends, respectively, are arranged on a common straight line with the second and third ends adjacent to each other. A third quarter wavelength element, having a fifth end and an opposite sixth end, is arranged adjacent to the first element with its fifth end adjacent to the first end of the first element and its sixth end both adjacent to and physically connected with the third end of the second element. A signal source or sink is coupled to the first end of the first element and the fifth end of the third element, respectively, for providing electrical energy to, and/or receiving electrical energy from the antenna.

7 Claims, 4 Drawing Sheets

END FED FLAT ANTENNA

This application is a continuation of application Ser. No. 434,233, filed Nov. 13, 1989, now abandoned.

BACKGROUND OF THE INVENTION

The present invention relates to a flat (planar) antenna of the dipole type which is arranged to be supplied with an electrical signal, and/or to produce an electrical signal at one end.

An antenna of the type to which the present invention relates may be contained in a transponder of a "passive interrogator label system".

A "passive interrogator label system system", so-called, is a radar system utilizing transponders which are capable of receiving an interrogating first signal, processing this signal and transmitting a second signal in reply that is derived from the first signal and contains encoded information. Because the encoded information normally includes an identification code that is unique to each transponder, and because the transponders of such a system are relatively light weight and small and may be easily attached to other objects to be identified, these transponders are sometimes referred to as "labels". Furthermore, the transponders, which may be implemented by SAW devices, carry no self-contained power source, such as a battery, that must be periodically replaced. Consequently, these transponders are denominated as being "passive"; hence the name "passive interrogator label system".

Passive interrogator label systems of the type to which the present invention relates are disclosed, for example, in the following U.S. patents:

U.S. Pat. No. 4,737,789 of Paul A. Nysen for "Inductive Antenna Coupling for a Surface Acoustic Wave Transponder";

U.S. Pat. No. 4,703,327 of Anthony J. Rossetti and Paul A. Nysen for "Interrogator/Receiver System for Use with a Remote Transponder"; and U.S. Pat. No. 4,737,790 of Halvor Skeie and Donald Armstrong for "Passive Interrogator Label System with a Surface Acoustic Wave Transponder Operating at its Third Harmonic and Having Increased Bandwidth."

In general, a passive interrogator label system includes an "interrogator" for transmitting a first radio frequency signal; at least one passive transponder which receives this first signal, processes it, and sends back a second radio frequency signal containing encoded information; and a receiver, normally located next to the interrogator, for receiving the second signal and decoding the transponder encoded information.

The passive transponder, as disclosed in these patents, comprises a SAW device and a dipole antenna, which is either electrically or inductively coupled to the SAW transducers on the SAW device. The dipole antenna may be formed either by printing conductive ink (e.g. silver ink) on a substrate in the prescribed antenna pattern, or by stamping a metal foil into the size and shape of the antenna pattern, and bonding this foil by heat and pressure to the substrate (e.g. a polyethyline coated Mylar sheet). The antenna with its substrate is therefore relatively flat and thin and, depending upon the radio frequency of operation, is relatively modest in its lateral dimensions.

For example, the antenna characteristics required for this application, operating at a frequency of approximately 915 MHz., determine that the antenna be physically approximately one inch wide and three inches long. The SAW device, to which the antenna is coupled, is also placed on the substrate to form the complete assembly or "label".

Whereas the dipole antenna, with the SAW device mounted between the dipoles, is satisfactory for most ID tag applications, it would be advantageous, in some applications, to locate the SAW device at one end of the antenna. Such arrangement would simplify packaging the SAW device—antenna combination (label) and would reduce the effect on the label of an adjacent physical body.

SUMMARY OF THE INVENTION

It is an object of the present invention, therefore, to provide a planar antenna of the dipole type which receives an electrical signal from, and feeds an electrical signal to, electrical terminals at one end of the antenna.

It is a further object of the present invention to provide a planar, end fed antenna which may be inductively coupled to a SAW device or other signal processing element.

These objects, as well as other objects which will become apparent from the discussion that follows, are achieved in accordance with the present invention, by providing (1) a first quarter wavelength element having a first end and an opposite second end; and (2) a second quarter wavelength element having a third end and an opposite fourth end. The first end, second end, third end and fourth end, respectively, of the first and second elements are arranged on a common, substantially straight line with the second and third ends adjacent to each other. In addition, a quarter wavelength third element is positioned adjacent to the first element. The third element has a fifth end and an opposite sixth end; the fifth end is arranged adjacent to the first end of the first element and the sixth end is arranged adjacent to, and is physically connected with the third end of the second element.

With this antenna, a SAW device, or other signal source or sink may be electrically coupled between the first end of the first element and the fifth end of the third element to provide an electrical signal to and/or receive an electrical signal from the antenna.

In a preferred embodiment of the present invention, this source or sink comprises an inductive loop connected between the aformentioned first end and the fifth end for transmitting and/or receiving an inductively coupled input/output signal to and/or from the antenna.

For a full understanding of the present invention, reference should now be made to the following detailed description of the preferred embodiments thereof, taken in conjunction with the accompanying drawings.

DESCRIPTION OF THE PREFERRED EMBODIMENTS

Figure 1:
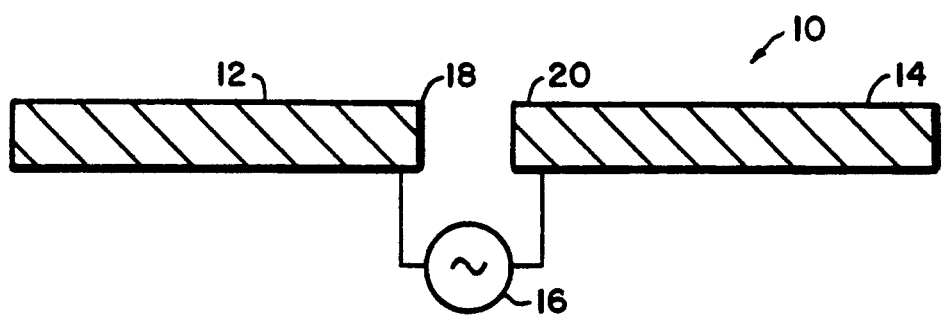
FIG. 1 is a representational diagram of a dipole antenna.

The preferred embodiments of the present invention will now be described with reference to FIGS. 1-10 of the drawings. Identical elements represented in these various figures are designated with the same reference numerals.

FIG. 1 illustrates a typical dipole antenna 10 comprising separate dipole antenna elements 12 and 14. A signal source or sink 16 is electrically connected to the inner ends 18 and 20 of the dipole elements 12 and 14, respectively, for supplying a signal to, or receiving a signal from the antenna 10.

Figure 2:
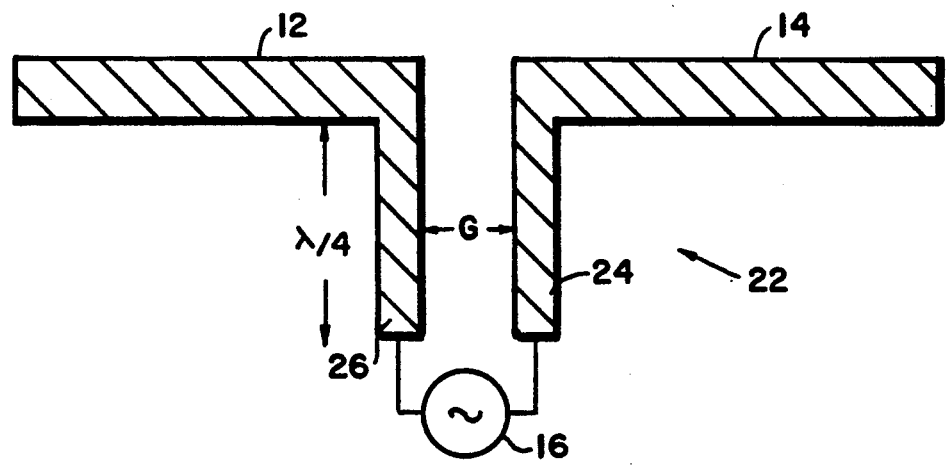
FIG. 2 is a representational diagram of a dipole antenna with a quarter wave feedline.

FIG. 2 shows how the dipole elements may be supplied via a quarter wave transmission line 22 formed by parallel conductive bars 24 and 26 spaced apart by a gap width G and having a length $\lambda/4$, where $\lambda$ is the electrical wavelength at the frequency of operation of the antenna. As is well known, the significant variables in the design of an RF transmission line are the length of the line, the gap width and the dielectric found in the gap.

Figure 3A:
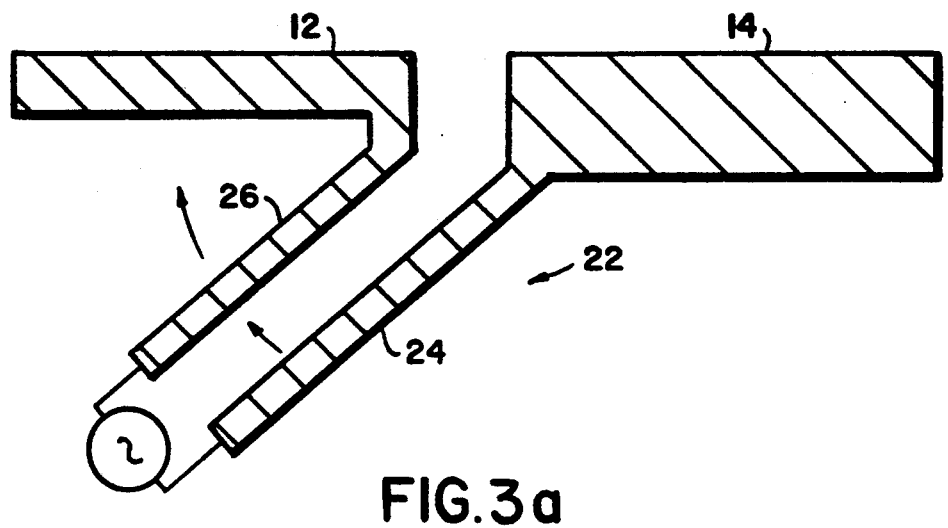
FIGS. 3a, 3b and 3c are diagrams of a dipole antenna with a quarter wave feedline progressively collapsed toward one dipole.
Figure 3B:
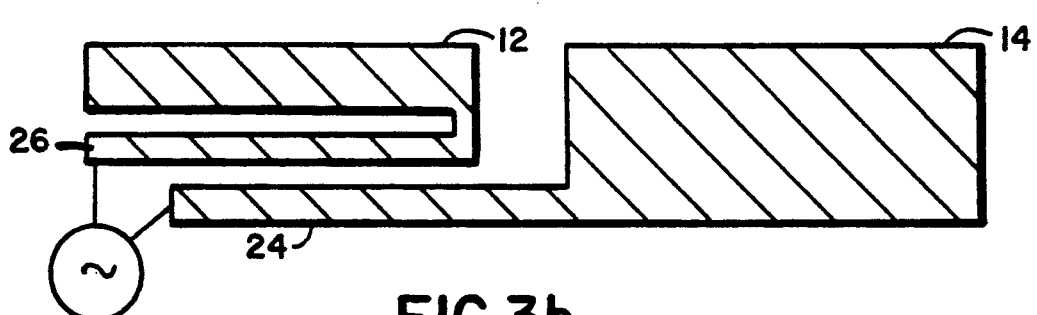
Figure 3C:
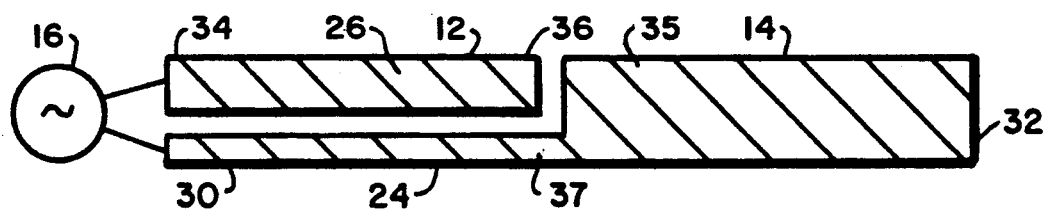

FIGS. 3a, 3b and 3c illustrate how the quarter wave-transmission line may be collapsed into one dipole element so that the antenna may be electrically connected to a signal source or sink arranged at one end.

As shown in FIGS. 3a and 3b, the transmission line may be folded toward one (the lefthand) dipole element; as shown in FIG. 3c, the feed line and the lefthand dipole element may be collapsed into a single bar. If the dipole element is the same length as the transmission line ($\lambda/4$, as indicated above), the apparent signal source or sink is at the center of the antenna.

The antenna shown in FIG. 3c thus comprises planar, conductive antenna elements 14 and 24, hereinafter called "second" and "third" elements, respectively. The third element has a linear portion 24 extending from one end 30 toward its opposite end. In addition, the antenna includes a planar, conductive linear coupling element 26, hereinafter called the "first" element, which extends adjacent to, and in parallel with, the linear portion 24 of the third element. The first element has one end 34 arranged adjacent to the end 30 of the third element and an opposite end 36 located adjacent to the opposite end 37 of the third element. The signal source or sink 16 is electrically connected between the end 30 of the third element and the end 34 of the first element.

Figure 4:
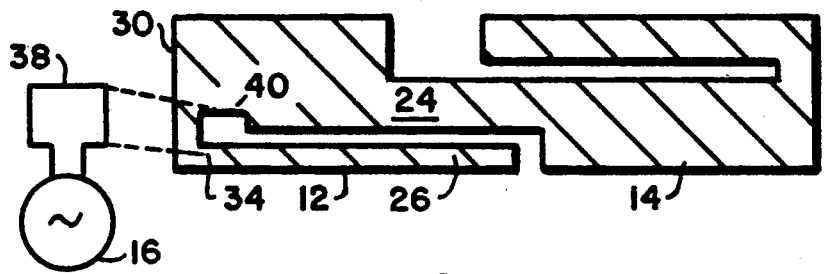
FIGS. 4–10 are diagrams of antennas in accordance with various preferred embodiments of the present invention.

FIG. 4 shows how a signal source or sink may be inductively coupled to an end fed dipole antenna according to the present invention. As is there shown, the signal source/sink 16 is electrically connected to an inductive loop 38 which, in turn, is inductively coupled to a partial loop 40 connected between the ends 30 and 34 of the antenna.

Figure 5:
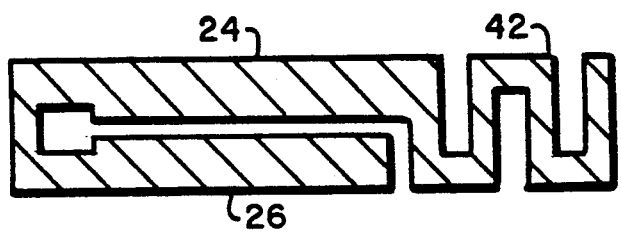

FIG. 5 illustrates an antenna with a meander portion 42 extending from a linear portion 24 of the antenna element. This meander portion adjusts the resonant length of the structure.

Figure 6:
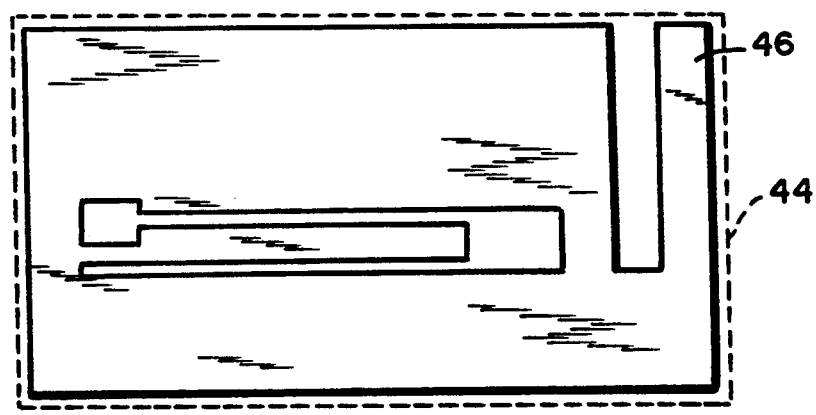

FIG. 6 shows an antenna which has been enlarged to its maximum dimensions on a card-like, non-conductive substrate 44. The resonant length of the structure is adjusted by providing a "tail" 46.

Figure 7:
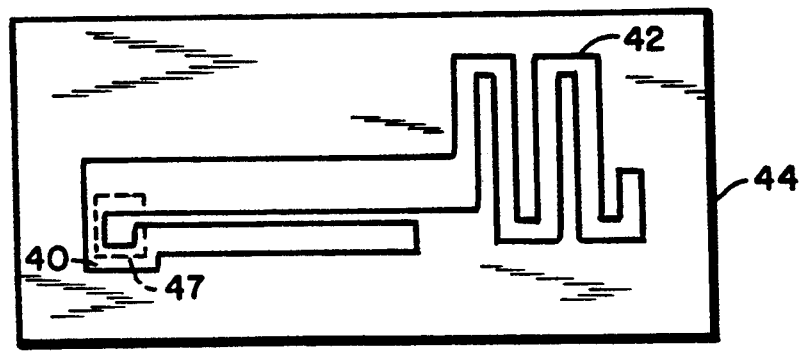

FIG. 7 shows an antenna similar to that of FIG. 5 arranged on a non-conductive substrate 44. The antenna is inductively coupled to a SAW device 47 which is placed directly over the antenna's inductive loop 40. The SAW device 47 incorporates a complementary inductive loop for coupling a signal to and from the antenna.

Figure 8:
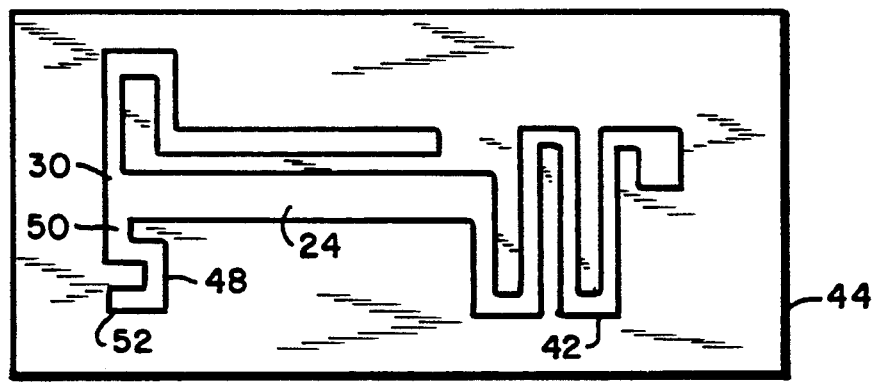

FIG. 8 shows still another antenna configuration, which is presently the best mode for practicing the invention. This antenna is similar to that of FIGS. 5 and 7 but includes an additional planar, conductive, meander element 48, disposed on the substrate surface, having 2 ends 50 and 52, respectively. The end 50 is electrically coupled to the end 30 of the antenna. This meander element serves to increase the inductance of the antenna, thereby tuning the antenna to the inductively coupled source or sink.

Figure 9:
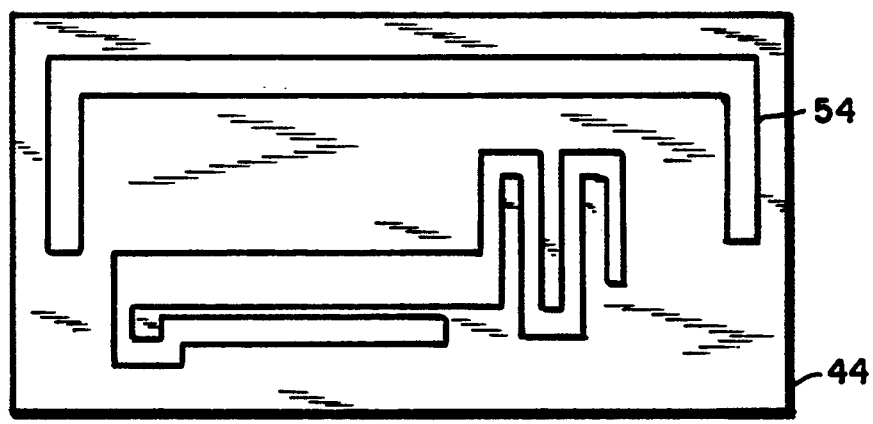
Figure 10:
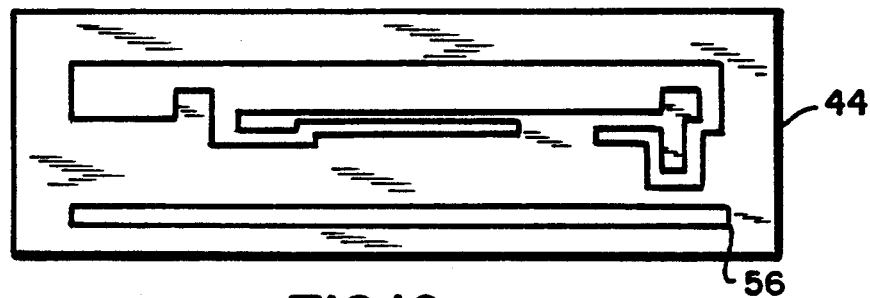

FIGS. 9 and 10 show additional antenna structures according to the present invention which include reflectors 54 and 56, respectively. These reflectors improve the isolation of the antenna from other reflecting elements in the vicinity.

In summary, the present invention contemplates a planar (flat) antenna incorporating a transmission line that permits direct electrical connection (or inductive coupling) to one end of the antenna. The transmission line is formed of two legs: a linear portion of one dipole element itself and a separate, linear coupling element. This transmission line operates to contain a non-radiating field within the interior of the antenna (between the two legs) while permitting radiation to occur on the outside of the antenna. Although the antenna is driven from one end, the antenna operates as if the signal source or sink were connected at its center.

There has thus been shown and described a novel planar antenna which fulfills all the objects and advantages sought therefor. Many changes, modifications variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

We claim:

1. An end fed dipole antenna for radiating electromagnetic waves of wavelength $\lambda$, said antenna comprising in combination:

(a) a first element having an effective radiating length substantially equal to $\lambda/4$, said first element having a first end and an opposite second end;

(b) a second element having an effective radiating length substantially equal to $\lambda/4$, said second element having a third end and an opposite fourth end, said first end, second end, third end and fourth end, respectively, being arranged on a common, substantially straight line with said second and third ends being adjacent to each other;

(c) a third element having an effective transmission length substantially equal to $\lambda/4$, said third element having a fifth end and an opposite sixth end and being arranged adjacent to said first element with said fifth end adjacent to said first end of said first element and said sixth end both adjacent to and physically connected with said third end of said second element; and (d) energy providing means coupled to said first end of said first element and said fifth end of said third element for providing electrical energy to, and/or receiving electrical energy from said antenna.

2. The antenna defined in claim 1, wherein said second element includes a meander portion.

3. The antenna defined in claim 1, wherein energy providing means (d) energy providing includes an inductive loop connected between said first end and said fifth end for receiving and/or transmitting an inductively coupled input/output signal.

4. The antenna defined in claim 1, further comprising a reflector element arranged adjacent to said first and second elements and substantially in parallel with said straight line, said reflector element having a substantially linear reflective portion extending from a point adjacent said first end to a point adjacent said fourth end of said first and second elements, respectively.

5. The antenna defined in claim 4, wherein said reflector element is disposed on a common substrate surface with said first and second elements.

6. The antenna defined in claim 1, wherein said first, second and third elements are disposed on a common planar substrate surface, and wherein said antenna comprises a planar conductive element disposed on said substrate surface and having a seventh end and an opposite eighth end, said seventh end being electrically coupled to at least one of said first and fifth ends.

7. The antenna defined in claim 3, wherein said first, second and third elements are disposed on a common planar substrate surface, and wherein said inductive loop includes a partial inductive loop connected between said first end and said fifth end for transmitting or receiving said input/output signal, said partial inductive loop being co-planar with said first, second and third elements.

* * * * *